June 7, 1960 A. H. P. KILCOIN 2,939,676
DIAPHRAGM VALVE
Filed April 4, 1957

INVENTOR.
ARTHUR H. P. KILCOIN
BY George Lynton

AGENT

United States Patent Office 2,939,676
Patented June 7, 1960

2,939,676

DIAPHRAGM VALVE

Arthur H. P. Kilcoin, 37 Bramerton St., Chelsea SW., London, England

Filed Apr. 4, 1957, Ser. No. 650,794

1 Claim. (Cl. 251—331)

This invention relates to improvements in diaphragm valves.

One of the prime problems to be dealt with in diaphragm valves is the transmission of axial pressure to the flexible diaphragm without subjecting the diaphragm to torsional stresses. Conventional diaphragm construction comprises a flexible diaphragm fixedly mounted over a valve seat. The diaphragm is actuated to sealingly contact the seat by an axially reciprocating spindle which in turn is operated by a handwheel screw-threadedly connected to the spindle. Rotation of the spindle is generally prevented by the provision of co-acting means between the spindle and valve casing whereby the means permit axial spindle movement while locking the spindle against rotary motion.

Due to the axial motion of the spindle, a multiplicity of parts are required to produce the desired effect and the overall height of the valve bonnet is unduly increased. In the instant invention these difficulties are eliminated by the provision of a spindle which does not move axially upon rotation, but instead is threadedly connected to a washer which drives the diaphragm to its sealing position. Various advantages result from this novel combination as will be described more fully below.

Consequently the primary object of this invention is the provision of a diaphragm valve which is reciprocated axially relative to a valve seat without torsional stress whereby the valve assembly is simple in construction and sufficient in operation.

Another invention object is the provision of a diaphragm valve wherein the diaphragm is reciprocated axially by an axially fixed rotating spindle which drives a washer axially and without rotary motion into engagement with the diaphragm.

A further inventive object is the provision of diaphragm valve wherein a diaphragm is driven into sealing engagement with a valve seat without being subjected to torsional stress by a non-rotating member of substantially the same cross-sectional area as the valve seat.

A still further object of this invention is the provision of a screw-operated diaphragm valve wherein a diaphragm is seated without torsional or bending stresses by a non-rotating member of cross-sectional area equivalent to the valve seat.

A still further object of this invention is the provision of a screw operated diaphragm valve wherein valve closure is effected by a non-rotating axially moving member actuated by an axially fixed rotating spindle and wherein the diaphragm is guided along the axis of the valve seat by the spindle.

Further objects and novel details of the invention will be disclosed in the following description and appended claims taken in conjunction with the attached drawings in which:

Figure 1:
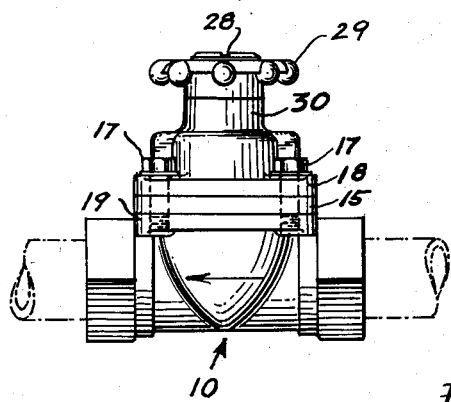
Figure 1 is an elevation of the valve assembly.

Referring now to the drawings, the improved valve construction is seen to comprise a housing 10 having an inlet 11 and an axially aligned outlet 12. Intermediate the inlet and outlet a centrally apertured valve seat 13 is provided surrounding a passageway 14 at right angles to the inlet-outlet axis. The flow through the seat 13 is controlled by a diaphragm 15 which is mounted over the seat 13 between the housing 10 and a bonnet 16. The bonnet and housing are secured together by bolts 17 which are inserted through an apertured bonnet flange 18, the diaphragm periphery and threaded into an apertured shoulder 19 surrounding and projecting beyond the valve seat 13. The outer surface of the shoulder is finely machined to co-act with the diaphragm periphery in sealing off the interior of the housing. Thus it is apparent that in addition to controlling flow through the valve seat, the diaphragm also positively prevents leakage into the bonnet thereby eliminating the necessity of a bonnet gland and preventing injurious contact with the actuating mechanisms housed in the bonnet. The diaphragm 15 is further equipped with a block 20 embedded into the diaphragm at the inner end and projecting beyond the diaphragm at the outer end providing an abutment 21. A central bore 22 is formed in the block to receive the threaded inner end 23 of operating spindle 24 for purposes to be described.

Figure 3:
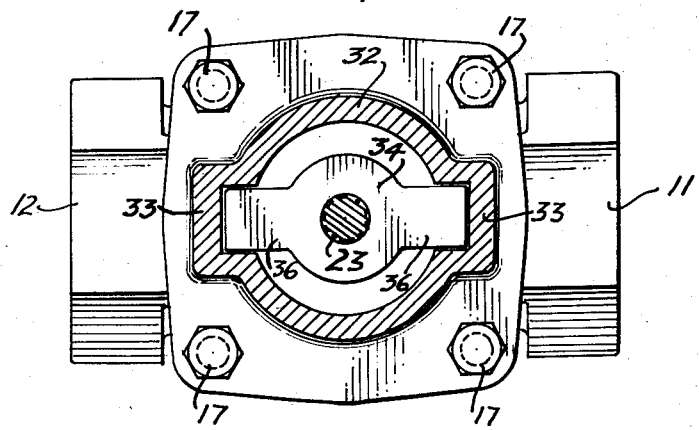
Figure 3 is a transverse sectional view taken through plane 3—3 of Figure 2.

Operating spindle 24 comprises a cylindrical shaft having an outer portion 25 of reduced diameter forming a shoulder 26 which projects slightly beyond the outer end of bonnet 16. An axial threaded bore 27 is formed in the spindle portion 25 for the reception of a set screw 28. A handwheel 29 is fixedly secured about the spindle between the set screw 28 and the shoulder 26. The spindle 24 fits snugly and rotatably within the reduced outer neck 30 of the bonnet with the inner end of the handwheel 29 sufficiently spaced from the outer end of neck 30 to permit unimpeded rotation of the handwheel-spindle assembly relative to the bonnet. The spindle 24 also includes a collar 31 adjacent the inner end 23 which fits snugly but rotatably against the transverse bonnet surface. It is thus seen that the spindle-handle assembly is rotatably swivelled to the neck 30 of the bonnet. The portions of the bonnet extending between the neck 30 and the flange 18 is enlarged to form a casing 32. As better seen in Figure 3, the casing 32 is shaped to include opposite cylindrical portions connected by similar opposing rectangular slots 33 which extend symmetrically parallel on both sides of the spindle axis. A washer 34 having similar oppositely extending wings 36 which fit snugly within slots 33, is axially threadedly mounted on the inner end 23 of the spindle. Due to the wings 36 co-acting with the side walls of slots 33, the washer cannot rotate but is free to reciprocate axially relative to the spindle. Hence rotation of spindle 24 results in pure axial reciprocation of washer 34. It is to be noted that the circular portion 37 of washer 34 is approximately equal in diameter to the surface 21 of block 20. Thus when axial movement of washer 34 causes the washer to apply inward pressure on block 20, the pressure so applied is distributed uniformly over the entire surface 21. Moreover, it is also stressed that the uniform application of sealing pressure on block 20 transfers pressure more directly to the sealing lip of seat 13. In previous construction pressure was applied directly through the spindle to a relatively small central area of block 20 thereby causing the block and diaphragm to bend as a beam between the periphery of the valve seat 13. Such bending introduces injurious unnecessary stresses in the block and diaphragm resulting in ultimate failure of these parts. In the instant case, the more direct substantially axial transfer of pressure from the washer to the valve seat virtually eliminates bending stresses and strains thereby increasing the efficiency of the sealing co-action and life of the valve.

A further feature of the instant invention to be noted is the co-action between the bore 22 and spindle end 23. The spindle end is of such a length that it always projects within bore 22 with a fairly close clearance. This clearance however is sufficient to prevent contact with the bore walls when the spindle is actuated. The clearance however is small enough to enable the spindle to function as a guide restricting the movement of the block along axial directions. Thus should a sudden surge of pressure in passageway 14 tend to deflect diaphragm 15 laterally during a valve closing operation, the spindle end 23 will restrict such a tendency to an insignificant magnitude. This restrictive function of the spindle however occurs only for a split second; the spindle and block being normally out of contact during valve closing.

Figure 2:
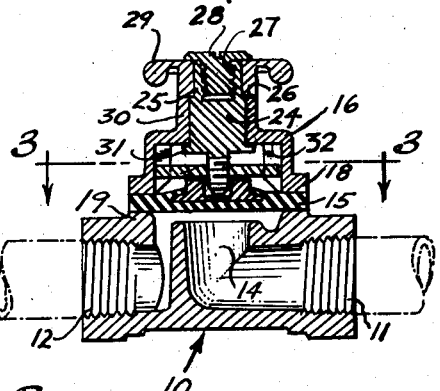
Figure 2 is a cross-sectional view taken through the flow and valve spindle axis, with the valve in open position.

When the washer 34 has been moved to the open position depicted in Figure 2, the diaphragm is opened by fluid pressure with the washer acting as an upper limit to the opening movement of the diaphragm. When fully opened, the block 20 abuts the washer, and also the inner end 23 of the spindle. Thus in the open position the spindle reinforces the washer in limiting the opening movement of the diaphragm, thereby limiting the wear and tear on the spindle threads especially in high pressure environments.

If desired the washer and block can be provided with a connection whereby opening movement of the washer positively exerts an opening movement upon the block, exclusive of fluid pressure (not shown).

Figure 4:
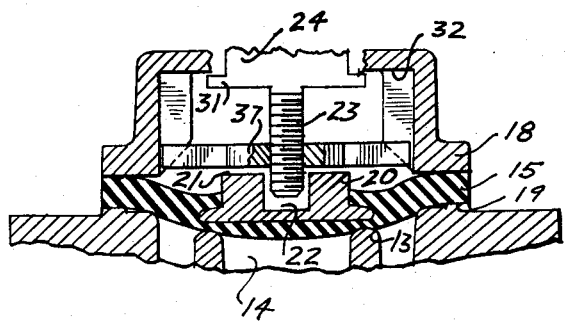
Figure 4 is an enlarged view of a portion of Figure 2 showing more clearly details of the means for actuating the diaphragm, with the diaphragm in closed position.

The valve is readily assembled by inserting the spindle into the neck valve 30 via apertured flange 18 until collar 31 contacts the internal surface 32 of the bonnet (see Figure 4). The handwheel is then mounted about the outer end 25 of the spindle adjacent the spindle shoulder 26. Set screw 28 is then secured in threaded bore 27 thereby rotatably fixing the spindle-handwheel assembly to the bonnet neck 30. The washer 34 is then threaded on the spindle end 23 with the wings 36 fitted into slots 33. This completes the bonnet assembly. The diaphragm 15 is then placed in position on the casing shoulder 19 and the bonnet assembly is properly aligned with the shoulder 19 with the diaphragm sandwiched therebetween. The assembly is completed by fastening bolts 17 in the provided holes thereby securing the bonnet assembly to the housing with the diaphragm in sealing position therebetween. The alignment of spindle end 23 in bore 22 also aids in centering the bonnet assembly relative to the diaphragm when the complete assembly is made.

Operation

Closure of the valve is obtained by rotating handwheel 29, which also causes rotation of spindle 24. Due to the threaded connection between spindle end 23 and washer 34, the washer is moved axially inward applying pressure uniformly to the surface 21 of block 20 resulting in the seating of diaphragm 15 on seat 13 sealing off passageway 14. During the closing movement no torsional stresses are transmitted to the block, the block is restricted to axial movement by spindle end 23, and due to more nearly axial alignment of the bearing surface 21 with valve seat 13, virtually no benching stresses are imposed on the diaphragm unit.

To open the valve, the wheel 29 is rotated in a reverse direction, thereby moving the washer 34 to an outer location shown in Figure 2. Thus sufficient clearance is provided between the block and washer to permit fluid pressure to move the diaphragm to an open position, with the washer 34 and spindle end 23 functioning as limits to the open position of the diaphragm.

It can now be appreciated that in addition to the advantages cited above, the axial fixed nature of the spindle 24 eliminate additional parts required in conventional valve types involving axial movement of the spindle. Moreover the required axial length of the bonnet is obviously reduced, permitting a more compact, sturdier construction.

Having thus described in detail the nature and attendant advantages of the invention, a grant of Letters Patent is solicited for the incorporated novel features in accordance with the following claim.

I claim:

A diaphragm valve comprising a housing, a pipe connection at each end of said housing, an opening in one side wall of said housing, a continuous imperforate flexible diaphragm of a size co-extensive with the outer edge of the wall of the housing surrounding said opening, a bonnet having a base co-extensive with the outer edge of said diaphragm, means for clamping said base and diaphragm against the wall of said housing surrounding said opening, a metal wear piece having a marginal portion embedded in the outer face of said diaphragm, an annular valve seat in said housing, said valve seat being spaced from the diaphragm when the face of the diaphragm is in the same plane as the face of the wall of the housing surrounding said opening, said annular valve seat being of a diameter slightly less than said wear piece, and means mounted in said bonnet for moving said wear piece and said diaphragm toward said valve seat, said last named means comprising a bar mounted in said bonnet for movement toward and from said wear piece, a threaded opening in said bar at a point overlying the center of said wear piece and a valve-operating spindle mounted in said bonnet with its end threaded in said opening.

References Cited in the file of this patent

UNITED STATES PATENTS

| | | |
|---|---|---|
| 916,629 | Throop | Mar. 30, 1909 |
| 2,388,989 | Mueser | Nov. 13, 1945 |
| 2,702,686 | Fortune | Feb. 22, 1955 |
| 2,707,481 | McPherson | May 3, 1955 |